(12) United States Patent
Norquest et al.

(10) Patent No.: US 10,140,885 B1
(45) Date of Patent: Nov. 27, 2018

(54) EASY GUITAR PLAYER

(71) Applicants: Lawrence A. Norquest, Dunedin, FL (US); Sheryl Norquest, Dunedin, FL (US)

(72) Inventors: Lawrence A. Norquest, Dunedin, FL (US); Sheryl Norquest, Dunedin, FL (US)

(*) Notice: Subject to any disclaimer, the term of this patent is extended or adjusted under 35 U.S.C. 154(b) by 0 days.

(21) Appl. No.: 15/585,449

(22) Filed: May 3, 2017

(51) Int. Cl.
*G10D 3/00* (2006.01)
*G09B 15/02* (2006.01)
*G10D 3/08* (2006.01)
*G09B 15/04* (2006.01)

(52) U.S. Cl.
CPC .......... *G09B 15/026* (2013.01); *G09B 15/04* (2013.01); *G10D 3/08* (2013.01)

(58) Field of Classification Search
CPC ......... G09B 15/026; G09B 15/04; G10D 3/08
USPC ........................................... 84/317, 315, 286
See application file for complete search history.

(56) References Cited

U.S. PATENT DOCUMENTS

| | | | |
|---|---|---|---|
| 8,319,082 B1* | 11/2012 | Bacon | G10D 3/08 84/314 R |
| 8,835,731 B1* | 9/2014 | Perry | G10D 3/08 84/317 |

* cited by examiner

*Primary Examiner* — Jianchun Qin

(57) ABSTRACT

A fingering assembly positionable over strings of a guitar is formed of a housing with buttons and a plate. Each button has an upper end adapted to be contacted and depressed by a user. Each button has a lower end. The plate has a plurality of levers. Each lever has an upper surface adapted to be contacted and depressed by a lower end of one of the buttons. Each lever has a lower surface adapted to contact a string of the guitar in response to a depressing of an associated button.

1 Claim, 4 Drawing Sheets

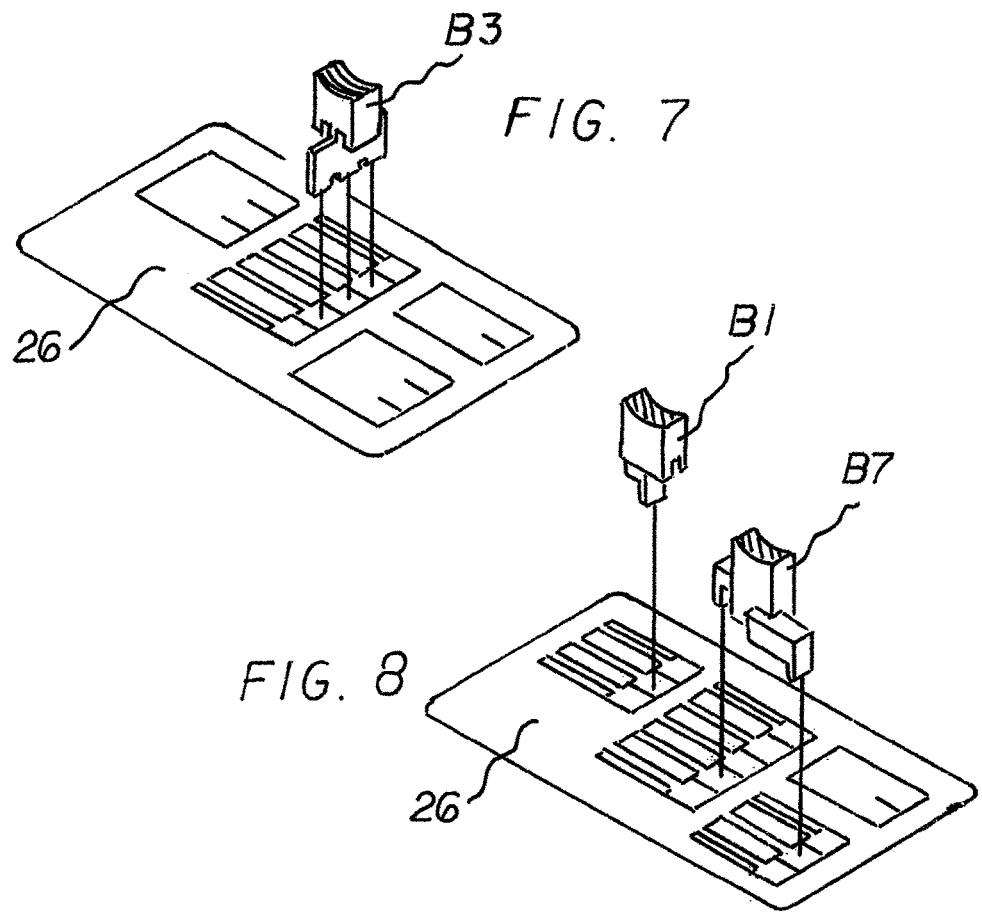
FIG. 7
FIG. 8
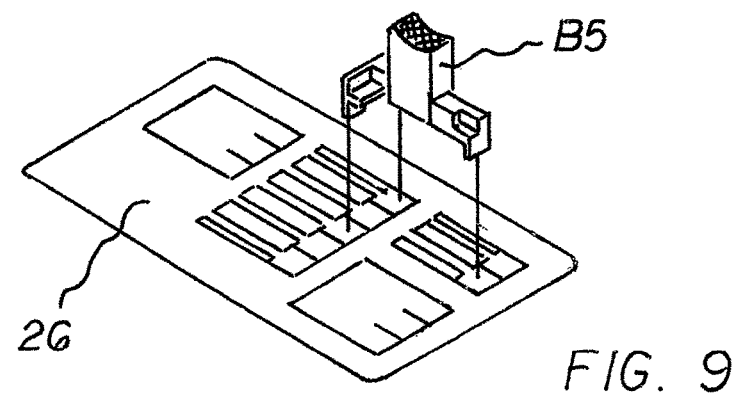
FIG. 9

EASY GUITAR PLAYER

BACKGROUND OF THE INVENTION

Field of the Invention

The present invention relates to an easy guitar player and more particularly pertains to facilitating the fingering of guitar strings, the making of music, and the teaching of a novice to play a guitar.

Description of the Prior Art

The use of music related devices is known in the prior art. More specifically, music related devices previously devised and utilized for the purpose of making and/or teaching music are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an easy guitar player that allows facilitating the fingering of guitar strings, the making of music, and the teaching of a novice to play a guitar.

In this respect, the easy guitar player according to the present invention substantially departs from the conventional concepts and designs of the prior art and, in doing so, provides an apparatus primarily developed for the purpose of facilitating the fingering of guitar strings, the making of music, and the teaching of a novice to play a guitar.

Therefore, it can be appreciated that there exists a continuing need for a new and improved easy guitar player which can be used for facilitating the fingering of guitar strings, the making of music, and the teaching of a novice to play a guitar. In this regard, the present invention substantially fulfills these needs.

SUMMARY OF THE INVENTION

In view of the disadvantages inherent in the known types of music related devices now present in the prior art, the present invention provides an improved easy guitar player. As such, the general purpose of the present invention, which will be described subsequently in greater detail, is to provide a new and improved easy guitar player and method which has all the advantages of the prior art and none of the disadvantages.

To attain this, from a broad perspective, the present invention essentially comprises a fingering assembly positionable over strings of a guitar. The fingering assembly is formed of a housing with buttons and a plate. Each button has an upper end adapted to be contacted and depressed by a user. Each button has a lower end. The plate has a plurality of levers. Each lever has an upper surface adapted to be contacted and depressed by a lower end of one of the buttons. Each lever has a lower surface adapted to contact a string of the guitar in response to a depressing of an associated button.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved easy guitar player which has all of the advantages of the prior art music related devices and none of the disadvantages.

It is another object of the present invention to provide a new and improved easy guitar player which may be easily and efficiently manufactured and marketed.

It is a further object of the present invention to provide a new and improved easy guitar player which is of durable and reliable constructions.

An even further object of the present invention is to provide a new and improved easy guitar player which is susceptible of a low cost of manufacture with regard to both materials and labor, and which accordingly is then susceptible of low prices of sale to the consuming public, thereby making such easy guitar player economically available to the buying public.

Lastly, it is an object of the present invention to provide an easy guitar player for facilitating the fingering of guitar strings, the making of music, and the teaching of a novice to play a guitar.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an exploded perspective showing of button B2 and the associated levers.

FIG. 8 is an exploded perspective showing of buttons B1 and B7 and the associated levers.

FIG. 9 is an exploded perspective showing of button B5 and the associated levers.

The same reference numerals refer to the same parts throughout the various Figures.

DESCRIPTION OF THE PREFERRED EMBODIMENT

Figure 1:
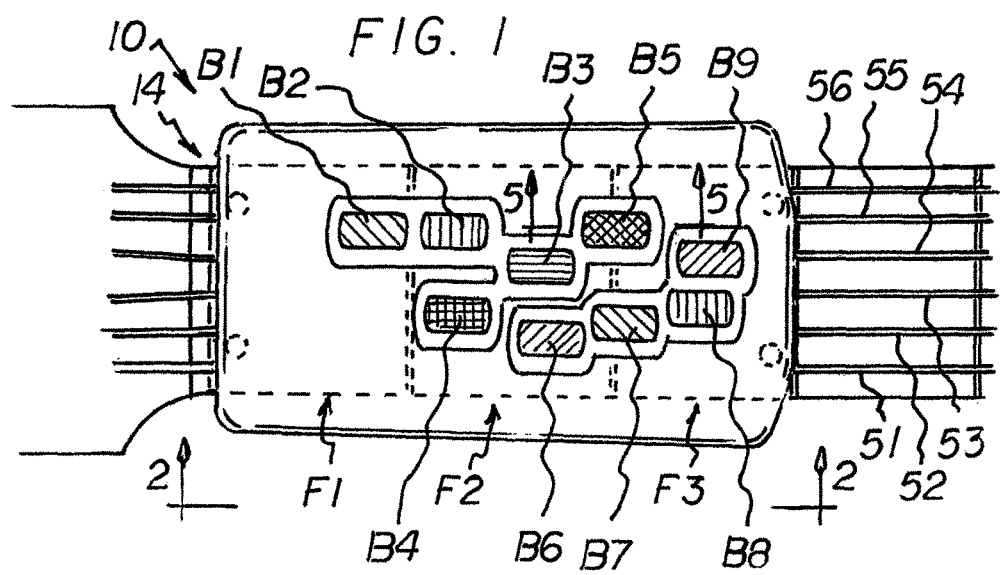
FIG. 1 is a plan view of an easy guitar pre constructed in accordance with the principles of the present invention.
Figure 2:
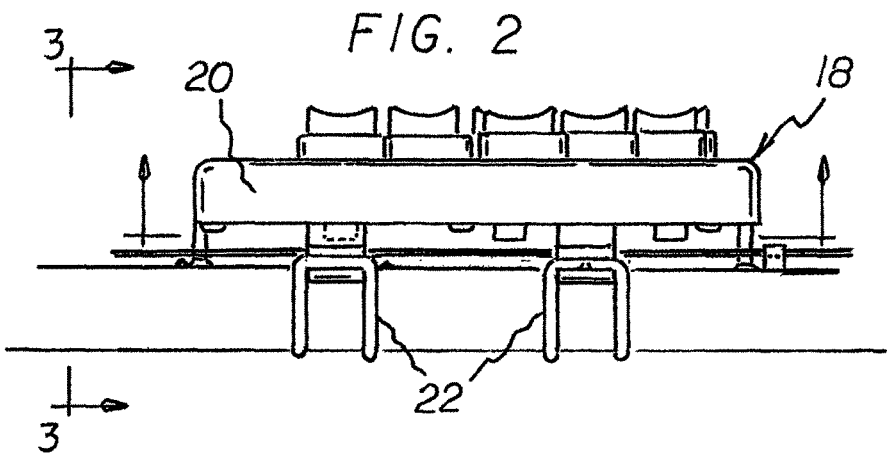
FIG. 2 is a side elevational view taken along line 2-2 of FIG. 1.
Figure 3:
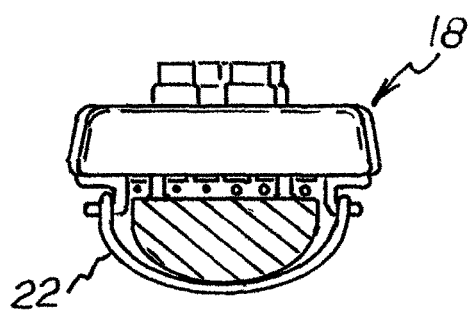
FIG. 3 is an end elevational view taken along line 3-3 of FIG. 2.
Figure 4:
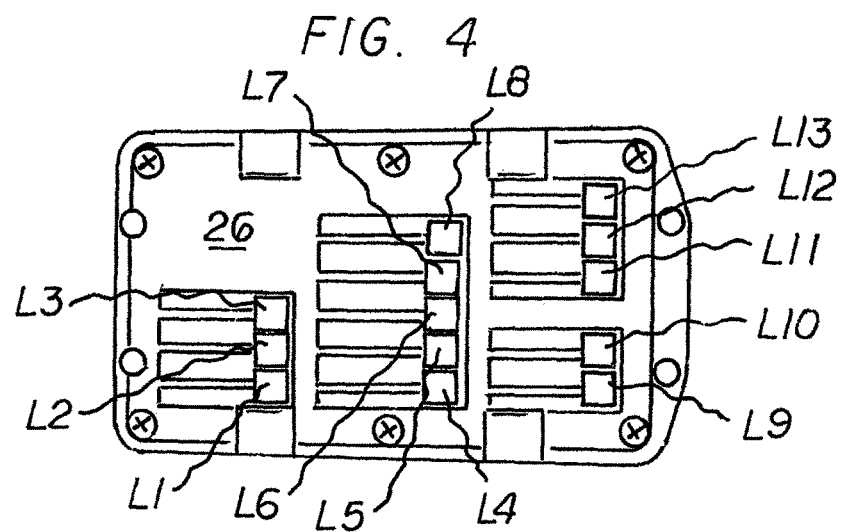
FIG. 4 is a bottom view of the plate and levers of FIG. 2.
Figure 5:
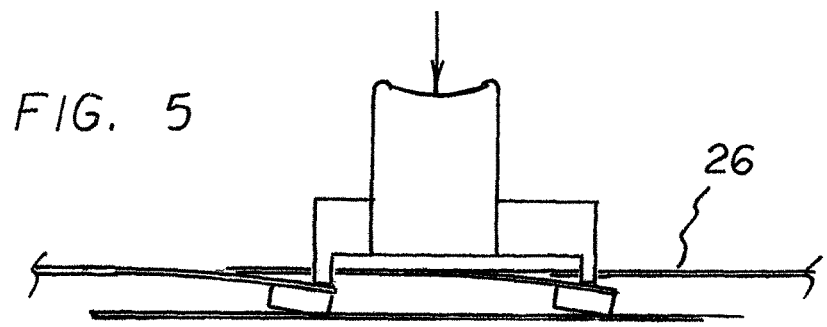
FIG. 5 is a cross sectional view taken along line 5-5 of FIG. 1.
Figure 6:
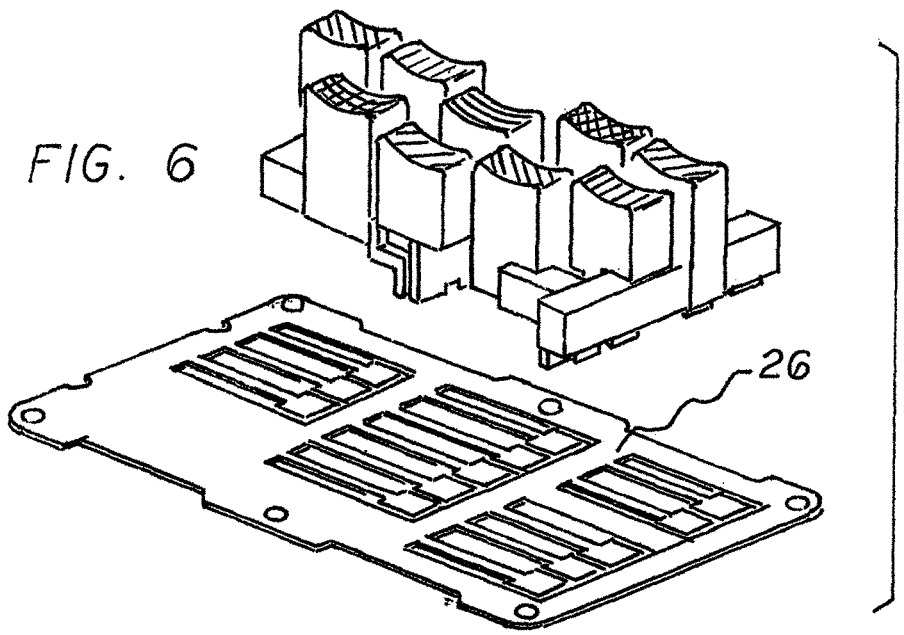
FIG. 6 is an exploded perspective showing of the buttons along with the levers.
Figures 10, 11, 12:
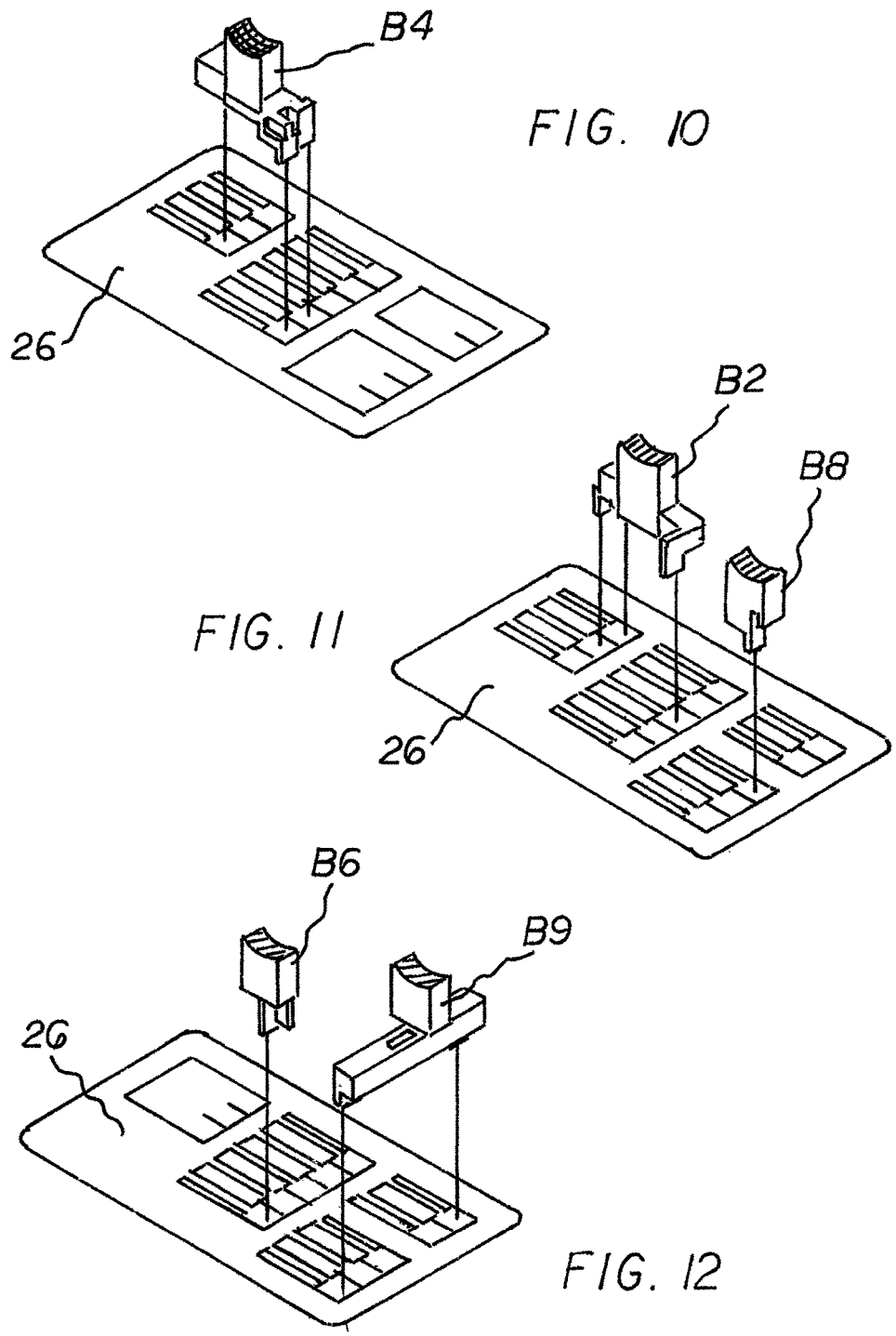
FIG. 10 is an exploded perspective showing of button B10 and the associated levers.
FIG. 11 is an exploded perspective showing of buttons B2 and B8 and the associated levers.
FIG. 12 is an exploded perspective showing of buttons B6 and B9 and the associated levers.

With reference now to the drawings, and in particular to FIG. 1 thereof, the preferred embodiment of the new and improved easy guitar player embodying the principles and concepts of the present invention and generally designated by the reference numeral 10 will be described.

The present invention, the easy guitar pro 10 is comprised of a plurality of components. Such components in their broadest context include a housing with buttons and a plate with levers. Such components are individually configured and correlated with respect to each other so as to attain the desired objective.

From a specific perspective, the invention of the present application is an easy guitar player system 10 for facilitating the fingering of guitar strings, the making of music, and the teaching of a novice to play a guitar. The fingering of the guitar strings and the making music and the teaching are done in a safe, convenient, and economic manner. The system includes a guitar 14 having six strings S1, S2, S3, S4, S5, S6, adapted to be strummed to provide rhythm. The strings are adapted to be fingered to distinguish notes. The strumming and fingering are adapted to make music.

The guitar has three frets F1, F2, F3 to form discrete areas on the strings to be fingered.

A fingering assembly 18 includes a housing 20 in a generally rectilinear configuration with a top, a bottom, and sides. Resilient cords 22 removably secure the housing to the guitar over the strings and over the frets.

The fingering assembly includes nine buttons B1 of color 1, B2 of color 2, B3 of color 4, B4 of color 4, B5 of color 5, B6 of color 6, B7 of color 7, B8 of color 8, B9 of color 9. Each button has an upper end adapted to be contacted and depressed by a user. Each button has a lower end.

The fingering assembly includes a plate 26. The plate is formed with three fret 1 levers L1, L2, L3 positioned over strings S4, S5, S6 respectively. The plate 26 is also formed with five fret 2 levers L4, L5, L6, L7, L8 positioned over strings S2, S3, S4, S5, S6 respectively. The plate 26 is also formed with 5 fret 3 levers L9, L10, L11, L12, L13 positioned over strings S1, S2, S3, S5, S6 respectively. Each lever is adapted to be contacted by an associated button lower end to resiliently bend and contact an associated string.

When button B1 is depressed, string S2 at fret F1 is contacted creating a C note.

When button B1 and button B7 are simultaneously depressed, string S4 at fret F2 is contacted creating an E note and string S5 at fret F3 is contacted creating a C note and a full C chord.

When button B2 is depressed, strings S1 and S2 at fret F1 are contacted creating an F note and a C note and string S3 at fret F2 is contacted creating an A note.

When button B3 is depressed, string S2 at fret F2 and string S4 at fret F2 and string S3 at fret F2 are contacted creating an A chord.

When button B4 is depressed, string S3 at fret F1 is contacted creating a G sharp note and also string S4 at fret F2 is contacted creating an E note and string S5 at fret F2 is contacted creating a B note and a full E chord.

When button B5 is depressed, string S1 and string S3 is contacted at fret F2 and also string S2 at fret F3 is contacted creating a D chord.

When button B6 and button B9 are simultaneously depressed, string S5 at fret F2 will be contacted and also string S6 at fret F1 will be contacted and also string S1 at fret F3 will be contacted creating a G chord.

When button B8 is depressed string S4 at fret F3 is contacted creating an F note which creates the full F chord.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An easy guitar player system for facilitating the fingering of guitar strings comprising, in combination:

a guitar having six strings S1, S2, S3, S4, S5 and S6 adapted to be strummed to provide rhythm, the strings adapted to be fingered to distinguish notes, the strumming and fingering adapted to make music;

the guitar having three frets F1, F2, and F3 to form discrete areas on the strings to be fingered;

a fingering assembly including a housing in a generally rectilinear configuration with a top and a bottom and sides, resilient cords removably securing the housing to the guitar over the strings and over the frets;

the fingering assembly including nine buttons, B1 of color 1, B2 of color 2, B3 of color 3, B4 of color 4, B5 of color 5, B6 of color 6, B7 of color 7, B8 of color 8, B9 of color 9, each button having an upper end adapted to be contacted and depressed by a user, each button having a lower end;

the fingering assembly including a plate formed with three fret 1 levers L1, L2, and L3 positioned over strings S4, S5, and S6 respectively, the plate formed with five fret 2 levers L4, L5, L6, L7, and L8 positioned over strings S2, S3, S4, S5, and S6 respectively, the plate formed with five fret 3 levers L9, L10, L11, L12, and L13 positioned over strings S1, S2, S3, S5, S6 respectively, each lever adapted to be contacted by the lower end of an associated one of the buttons in response to depressing a button to resiliently bend and contact an associated one of the strings; whereby:

when button B1 is depressed, string at fret F1 is contacted creating a C note;

when buttons B1 and B7 are simultaneously depressed, string at fret F2 is contacted creating an E note and also string S5 at fret F3 is contacted creating a C note and a full C chord;

when button B2 is depressed, strings S1 and S2 at fret F1 are contacted creating an F note and a C note and string S3 at fret F2 is contacted creating an A note;

when button B3 is depressed, string S2 at fret F2 and string at fret F2 and string S3 at fret F2 are contacted creating an A chord;

when button B4 is depressed, string S3 at fret F1 is contacted creating an G sharp note and also string S4 at fret F2 is contacted creating an E note and string S5 at fret F2 is contacted creating a B note and a full E chord;

when button B5 is depressed string S1 and S3 are contacted at fret F3 and also string S2 at fret F3 is contacted creating a D chord;

when button B6 and button B9 are simultaneously depressed, string S5 at fret F2 and will be contacted and also string S6 at fret F1 will be contacted and also string S1 at fret F3 will be contacted creating a G chord; and when button B8 is depressed string S4 at fret F3 is contacted creating an F note which creates the full F chord.

* * * * *